Patented Sept. 26, 1933

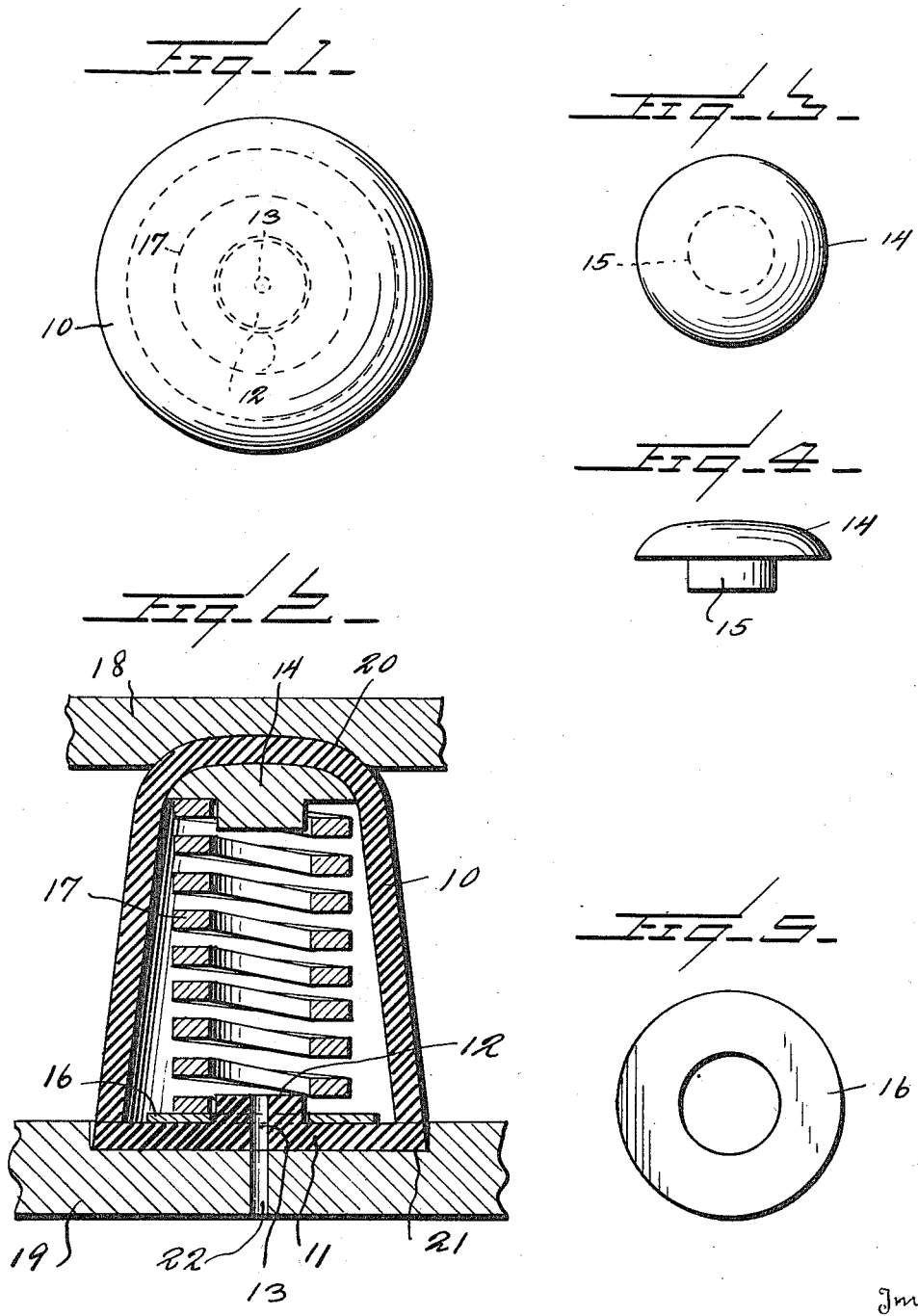

1,928,526

UNITED STATES PATENT OFFICE 1,928,526

SPRING SUPPORT

Nate Fellabaum, Findlay, Ohio

Application June 25, 1932. Serial No. 619,323

5 Claims. (Cl. 267—33)

This invention relates to resilient supports used in the automobile art for the nonrigid suspension of automobile motors or other parts.

The general object of this invention is to provide a supporting unit of this character which may be readily put in place, readily removed, may be used for a large variety of different purposes, and which may be used either alone, in pairs or in combination, as necessity may require.

A further object is to provide a construction of this character embodying an outer shell or casing of rubber or equivalent elastic material having a relatively small air vent in one end, there being a compression spring disposed within the rubber casing or shell and resisting compression of the casing, the air disposed within the casing thus assisting the spring to cushion a motor from the shocks, jars and strains incident to driving over relatively rough roads.

Other objects will appear in the course of the following description.

My invention is illustrated in the accompanying drawing, wherein:—

Figure 1 is a top plan view of my supporting unit;

Figure 2 is a vertical section through the unit and showing upper and lower elements with which the unit is engaged;

Figure 3 is a top plan view of the head for the spring;

Figure 4 is a side elevation thereof;

Figure 5 is a top plan view of the metallic spring base or seat.

Referring to this drawing and particularly Figure 2, it will be seen that my supporting unit comprises an exterior hollow body casing or shell designated 10 of live rubber. This body 10 has a top wall and a side wall which extends downward and outward and merges into the top wall. The bottom wall 11 of the body is likewise preferably formed of rubber which is vulcanized to the side wall after the spring and other parts to be described are inserted. This bottom wall 11 has an upwardly extending stud or boss 12 and an air vent 13.

Disposed within the hollow body 10 and bearing against the top wall of the hollow body is a head 14 having a rounded upper surface conforming to the rounded inner surface of the body 10 at its top and having a central hub 15. Disposed upon the bottom wall 11 and surrounding the hub 12 is an annular metal plate 16 constituting a spring seat and bearing at one end against this spring seat 16 and at the other end against the head 14 is a compression spring 17. This spring is preferably of steel.

When the head 14, the spring 17 and the annular plate 16 have been inserted within the body 10, the wall 11 is disposed against the side wall of the body and vulcanized thereto so that the spring is entirely enclosed in rubber. The action of this spring is assisted by the air enclosed within the rubber body 10 which has, of course, a cushioning effect due to the small air vent 13 through which the air must be forced when the unit is compressed.

I have illustrated this unit as being disposed between a supported element 18 and a supporting element 19. Preferably the element 18 is formed with a recess 20 which conforms to and receives the upper end of the body 10 while the element 19 is formed with a recess 21 which conforms to and receives the lower end of the body 10. This lower element 19 is also formed with an opening 22 registering with the opening 13 so as to provide the air vent heretofore mentioned.

It will be obvious that these cushions or resilient supporting members may be completed at the factory and sold for introduction into any part of the mechanism of a motor car where a cushioning support or spring support is desirable to be used and that these cushions or supports may be used under a large variety of circumstances and are not thus limited to use in a motor car suspension. It is also to be understood that the thickness of the wall of the body 10 will depend upon the work for which it is intended to be used and that the size and internal capacity of the body 10 will depend upon the incidents of its use. The same is true of the spring 17 which will vary in strength and cross section depending upon the work to be done.

The support or cushion has been designed in the form of a truncated cone for the two-fold purpose of securing greater wall support than would be the case with a perfect cylinder, and secondly to secure ease in manufacture. The bottom is vulcanized to the side wall at the lower end of the side wall, thus securing greater facility in properly fitting the parts and securing a greater firmness at the point of junction as pressure will hold these two parts together.

I claim:—

1. A suspension unit of the character described, comprising a hollow body of elastic rubber, the bottom of the body being formed with an upwardly extending central boss and with an air vent, an annular metallic seat disposed on the bottom of the body around said boss, a coiled compression spring having its lower end disposed upon said seat, and a head engaged with the upper end of the spring and bearing against the upper end of the hollow body.

2. A suspension unit of the character described, comprising a hollow upwardly tapering body, the upper end of the body being rounded, the lower end of the body being flat, the bottom of the body having an air vent and an upwardly extending boss, an annular metallic spring seat disposed against the bottom and surrounding the boss, a coiled compression spring resting at one end upon said seat and surrounding the boss, and a head having an outer surface fitting the inner surface of the upper end of the body and having a boss extending into the spring, the spring bearing against the head.

3. A suspension unit of the character described, including a hollow body of elastic rubber the body having the general form of a truncated cone and having a bottom wall provided with a relatively small air vent, a rigid metallic head disposed within the hollow body and bearing against the top thereof and fitting against the under face of said top, an annular metallic seat disposed on the bottom of the body and concentric to the vent, and a coiled compression spring having its lower end disposed against said seat and its upper end engaged against the under face of said head.

4. A suspension unit of the character described including a hollow body of elastic rubber, the body having the general form of a truncated cone, the upper end of the body being rounded, a flat bottom wall to said body provided with an air vent, the side wall and top of the body being relatively thick, a rigid metallic head disposed within the body and rounded upon its upper surface to fit against the under face of the top of the body, and a coiled compression spring operatively bearing against the lower wall of the body and against said metallic head.

5. A suspension unit of the character described including a hollow body of elastic rubber, the body having the general form of a truncated cone and having a bottom wall, the walls being of relatively thick rubber, and a spring disposed within the hollow body and resisting longitudinal compressive stresses on the hollow body, the body having an air vent.

NATE FELLABAUM.